US009621088B2

United States Patent
Niemoeller et al.

(10) Patent No.: US 9,621,088 B2
(45) Date of Patent: Apr. 11, 2017

(54) SYSTEM AND METHOD FOR REDUCING ICE AND/OR CONDENSATION FORMED ON A POWER COMPONENT

(71) Applicant: General Electric Company, Schenectady, NY (US)

(72) Inventors: Benjamin Arthur Niemoeller, Cave Spring, VA (US); Steven Wade Sutherland, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 549 days.

(21) Appl. No.: 14/191,773

(22) Filed: Feb. 27, 2014

(65) Prior Publication Data

US 2015/0244297 A1 Aug. 27, 2015

(51) Int. Cl.
  *F03D 7/02* (2006.01)
  *F03D 9/00* (2016.01)
  (Continued)

(52) U.S. Cl.
  CPC ............. *H02P 9/08* (2013.01); *F03D 7/00* (2013.01); *F03D 7/026* (2013.01); *F03D 7/0284* (2013.01);
  (Continued)

(58) Field of Classification Search
  CPC .......... F03D 7/026; F03D 7/00; F03D 7/0284; F03D 17/00; F03D 80/40; F03D 80/00; Y02E 10/723; H02P 9/08; H02P 9/006; H02K 15/125; F05B 2260/20; F05B 2270/303; F05B 2270/325; H05B 3/00; H05B 3/84; H05B 3/845; H05B 3/86;
  (Continued)

(56) References Cited

U.S. PATENT DOCUMENTS 4,808,896 A  2/1989 Katsuragi et al.
5,726,880 A  3/1998 Bailey et al.
(Continued)

FOREIGN PATENT DOCUMENTS

DE  102013223568 A1 * 5/2015 ............. F03D 80/40
JP    05288004 A    11/1993

OTHER PUBLICATIONS

European Search Report and Opinion issued in connection with corresponding EP Application No. 15155812.9 on Jul. 6, 2015.

*Primary Examiner* — Essama Omgba
(74) *Attorney, Agent, or Firm* — Dority & Manning, P.A.

(57) ABSTRACT

The present disclosure is directed to a system and method for reducing ice or condensation that forms on a power component of a wind turbine during a power outage. The method includes determining an ambient temperature near the power component; providing one or more parameters of the power component; determining a down time of the power component for the power outage; determining a wait time for the power component to stay offline as a function of the ambient temperature, the one or more parameters, and the down time of the power component; and, heating the power component for the wait time before supplying power to the power component such that a surface temperature of the power component is raised above the ambient temperature. As such, the method prevents the power component from being energized when condensation or ice may be present.

13 Claims, 7 Drawing Sheets

(51) Int. Cl.
  *F01D 5/18* (2006.01)
  *H02P 9/08* (2006.01)
  *F03D 7/00* (2006.01)
  *H02P 9/00* (2006.01)
  *H02K 15/12* (2006.01)
  *F03D 17/00* (2016.01)

(52) U.S. Cl.
  CPC ........... *F03D 17/00* (2016.05); *H02K 15/125* (2013.01); *H02P 9/006* (2013.01); *F05B 2260/20* (2013.01); *F05B 2260/85* (2013.01); *F05B 2270/303* (2013.01); *F05B 2270/325* (2013.01); *Y02E 10/723* (2013.01)

(58) Field of Classification Search
  CPC ...... H05B 1/00; H05B 1/02; H05B 2003/002; H05B 2003/008; H05B 2003/031
  USPC ..................................................... 416/39, 95
  See application file for complete search history.

(56) References Cited

U.S. PATENT DOCUMENTS

| | | | |
|---|---|---|---|
| 5,775,281 A | 7/1998 | Smith | |
| 7,098,550 B2* | 8/2006 | Wobben | F03D 9/002 290/44 |
| 7,637,715 B2 | 12/2009 | Battisti | |
| 7,809,477 B2* | 10/2010 | Nitzpon | F03D 7/026 290/44 |
| 8,348,609 B2* | 1/2013 | Haraguchi | F03D 7/0212 416/1 |
| 8,390,140 B2* | 3/2013 | Bolln | F03D 7/026 290/44 |
| 8,909,477 B2* | 12/2014 | Schietke | F03D 7/026 290/44 |
| 2009/0001723 A1* | 1/2009 | Nitzpon | F03D 7/026 290/44 |
| 2009/0195923 A1 | 8/2009 | Strom et al. | |
| 2010/0189560 A1* | 7/2010 | Haraguchi | F03D 7/0212 416/1 |
| 2010/0253079 A1 | 10/2010 | Bolln et al. | |
| 2012/0104758 A1* | 5/2012 | Schietke | F03D 7/026 290/44 |
| 2013/0028738 A1 | 1/2013 | Nordin et al. | |
| 2014/0056706 A1* | 2/2014 | Laurberg | F03D 7/042 416/1 |
| 2014/0091572 A1* | 4/2014 | Jepsen | F03D 7/026 290/44 |
| 2015/0023792 A1* | 1/2015 | Spitzner | F03D 11/0025 416/1 |
| 2015/0244297 A1* | 8/2015 | Niemoeller | H02P 9/08 290/44 |

* cited by examiner

SYSTEM AND METHOD FOR REDUCING ICE AND/OR CONDENSATION FORMED ON A POWER COMPONENT

FIELD OF THE INVENTION

The present subject matter relates generally to alternative energy systems and, more particularly, to a system and method for reducing ice and/or condensation that forms on a power component during a power outage.

BACKGROUND OF THE INVENTION

Generally, alternative energy systems, e.g. wind and/or solar power systems, utilize various power components to convert energy from one form to another. For example, a wind turbine generally includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy by a power converter. Further, the power converter typically converts the electrical energy form one form to another, e.g. converting between alternating current (AC) and direct current (DC). In addition, solar power systems typically include a solar inverter to convert variable DC output of a photovoltaic solar panel into a utility frequency AC that can be fed into a commercial electrical grid or used by a local, off-grid electrical network.

Many of these energy systems are located in an environment lacking climate control. Thus, if the power components are de-energized for a period of time (e.g. during a power outage), condensation or ice may build up or otherwise accumulate on the components. Due to the hazards associated with applying energy to components with accumulated ice and/or condensation, conventional systems utilize a "heat soak" method to detect and clear the system of ice and/or condensation before restarting the component after a power outage. For example, a typical heat soak system employs one or more heaters, coolant pumps, and stirring fans configured to melt the ice and evaporate condensation from the power components. In addition, the systems are configured to wait until sensed components and coolant temperatures are above ambient temperatures. The systems are then configured to "heat soak" the components for an additional time period before re-applying energy to the system (e.g. 70 minutes). Often times, however, the additional wait period or "heat soak" period is overly conservative. For example, conventional heat soak systems typically apply the same wait period to all power components that experience a power outage regardless of how long the components have been off-line, thereby resulting in a loss in power production.

Accordingly, a system and method that addresses the aforementioned problems would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for reducing ice or condensation that forms on a power component of a wind turbine during a power outage. The method includes determining an ambient temperature near the power component. Further, the method includes providing one or more parameters of the power component. In one embodiment, the parameters may include at least one of a time stamp, a heat soak timer value, a permissive state, a thermal memory, or similar. The method also includes determining a down time of the power component for the power outage. A next step includes determining a wait time for the power component to stay offline as a function of the ambient temperature, the one or more parameters, or the down time of the power component. Further, the method includes heating the power component for the wait time before supplying power to the power component such that a surface temperature of the power component is raised above an ambient temperature. As such, the method prevents the power component from being energized when condensation or ice may be present.

In another embodiment, if the ambient temperature is above a freezing temperature, the method may include setting the wait time approximately equal to a thermal time constant between an observed surface temperature of the power component and a monitored surface temperature of an additional nearby power component of the wind turbine. In one embodiment, the power component of the wind turbine may include a direct current (DC) link including one or more capacitors. In another embodiment, the additional nearby power component of the wind turbine may include a power semiconductor device that is thermally and electrically coupled to the DC link.

In yet a further embodiment, if the ambient temperature is below a freezing temperature, the method may determine the wait time by determining a thermal time constant of the power component; inferring a surface temperature of the power component at a start of the power outage based on at least one of the thermal memory, the time stamp, the down time, or the thermal time constant; and determining the wait time based on the inferred surface temperature.

In another embodiment, the step of determining the wait time based on the inferred surface temperature may include determining a difference between the heat soak timer value of the power component and the down time of the power component. In still another embodiment, the method may further include storing the one or more parameters of the power component in a memory store.

In another aspect, the present subject matter is directed to a method for reducing ice or condensation that forms on a power component of an energy system during a power outage, wherein the energy system is located in an uncontrolled temperature environment. The method includes determining an ambient temperature near the power component. Further, the method includes providing one or more parameters of the power component. In one embodiment, the parameters may include at least one of a time stamp, a heat soak timer value, a permissive state, a thermal memory, or similar. The method also includes determining a down time of the power component for the power outage. A next step includes determining a wait time for the power component to stay offline as a function of the ambient temperature, the one or more parameters, or the down time of the power component. Further, the method includes heating the power component for the wait time before supplying power to the power component such that a surface temperature of the power component is raised above an ambient temperature.

It should be understood that the method may further include any of the steps or features described herein. In addition, the energy system may include any of the following: a wind turbine, a solar power system, a gas turbine, or similar.

In another aspect, the present subject matter is directed to a system for reducing ice or condensation that forms on a power component of a wind turbine during a power outage. The system includes a processor and a heat-exchange assembly communicatively coupled to a controller. The processor is configured to: provide one or more parameters of the power component; determine a down time of the power component for the power outage; and determine a wait time for the power component to stay offline as a function of an ambient temperature, the one or more parameters, or the down time of the power component. Further, the heat-exchange assembly is configured to heat the power component for the wait time before supplying power to the power component such that a surface temperature of the power component is raised above the ambient temperature near the wind turbine.

In another embodiment, the system may include one or more temperature sensors configured to measure one or more temperatures of the wind turbine. In a further embodiment, the heat-exchange assembly may include at least one of or a combination of the following: one or more heat exchanger, one or more reservoirs, one or more heaters, one or more pumps, or one or more fans.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
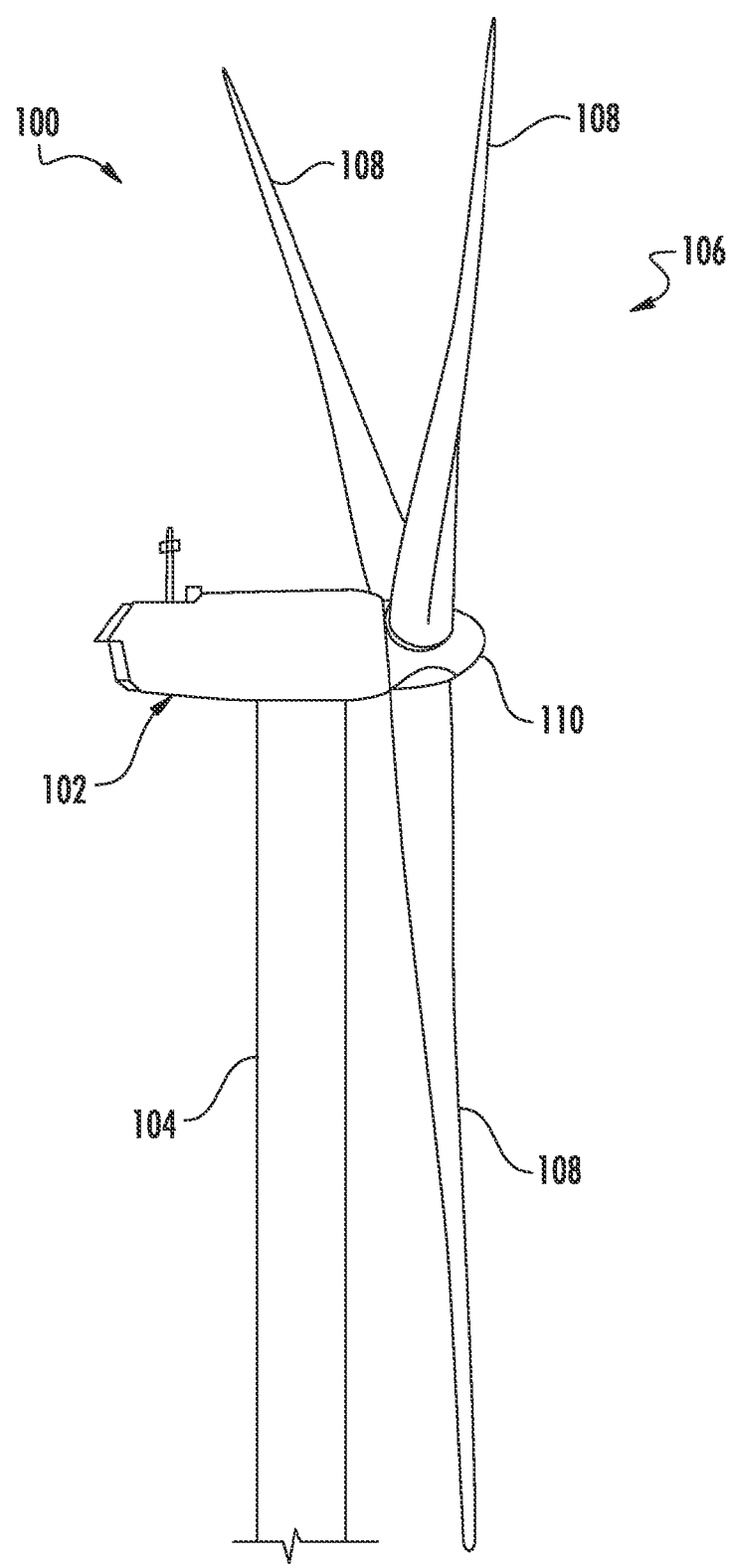
FIG. 1 illustrates a perspective view of a portion of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present invention is described herein as it may relate to power components of a wind turbine, including, at least, generators, power semiconductors devices, power converters, power inverters, bridge rectifiers, and/or similar. It should be appreciated, however, that the unique system and method in accordance with principles of the invention is not limited to use with wind turbines, but is applicable to any suitable power application. For example, the system and method described herein is also particularly suitable for solar power systems.

In general, the present subject matter is directed to a system and method for reducing ice and/or condensation that forms on a power component during a power outage. In one embodiment, the present disclosure includes determining an ambient temperature near the power component and one or more parameters of the power component (e.g. a time stamp, a heat soak timer value, a permissive state, or a thermal memory). The present subject matter is also configured to determine a down time of the power component during the power outage. Further, the present disclosure is configured to determine a variable wait time (e.g. a heat soak time) for the power component to stay offline as a function of the ambient temperature, wherein the wait time varies based on the one or more parameters and the down time of the power component. The power component is then heated for the wait time before supplying power to the power component such so as to raise a surface temperature of the power component above the ambient temperature. In other words, in one embodiment, the present disclosure is directed to determining a variable heat soak time for the power component based on the thermal mass of the power component whose surface temperature is observed and the thermal impedance between the power component and a nearby component whose temperature is monitored.

As used herein, the term "thermal mass" describes how the mass of a component resists against temperature fluctuations. Further, the thermal mass of a component is typically equal to the thermal capacitance or the heat capacity of the component or the ability of the component to store thermal energy. As used herein, the term "thermal memory" generally refers to the time it takes for a surface temperature of a component to reach an ambient temperature. As used herein, the term "thermal time constant" generally refers to a ratio of the density, volume, and heat capacity of an object and the heat transfer coefficient and the surface area of the object. Further, the thermal time constant generally states that objects having larger masses and heat capacities lead to slower changes in temperatures, whereas objects having larger surface areas and better heat transfer coefficients lead to faster temperature changes. As used herein, the term "thermal impedance" generally refers to the ratio of a temperature difference between two objects and the power dissipation.

The present subject matter has many advantages not present in the prior art. For example, conventional systems have a fixed heat soak timer (e.g. 70 minutes) that is often overly conservative, whereas the present disclosure more closely reflects the thermal mass of the power component and the thermal impedance between the power component and the nearby component whose temperature is monitored. As such, the present disclosure provides a faster warm-up sequence, greatly improving turbine power availability on electrical grids subject to frequent outages, while still keeping wet components from being energized. In addition, the present disclosure reduces the number of required temperature sensors. Further, the present disclosure eliminates the need for a humidity sensor in the electrical cabinets, which have proven unreliable in the past.

Referring now to the drawings, FIG. 1 is a perspective view of a portion of an exemplary wind turbine 100 according to the present disclosure. The wind turbine 100 includes a nacelle 102 that typically houses a generator (not shown). The nacelle 102 is mounted on a tower 104 having any suitable height that facilitates operation of the wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
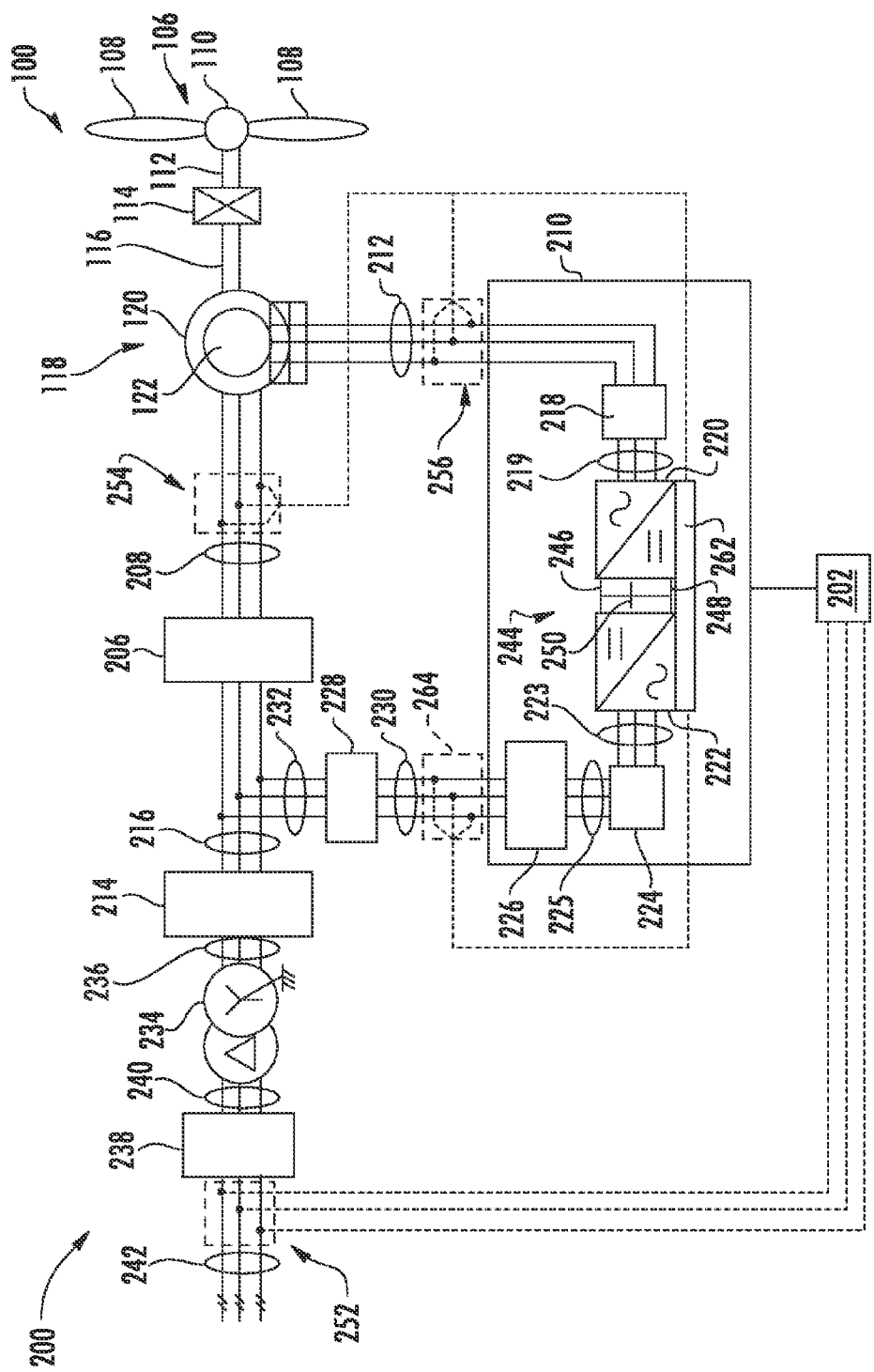
FIG. 2 illustrates a schematic view of one embodiment of an electrical and control system suitable for use with the wind turbine shown in FIG. 1.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a breaker-side bus 240, a grid circuit breaker 238, and a grid bus 242.

Figure 3:
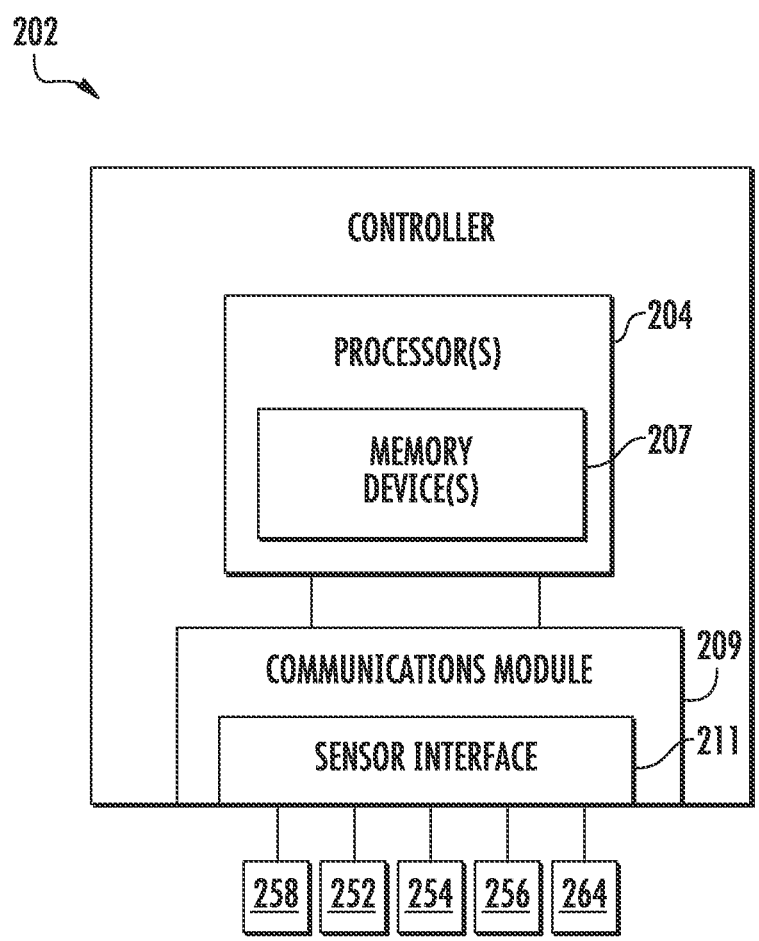
FIG. 3 illustrates a block diagram of one embodiment of a controller suitable for use with the wind turbine shown in FIG. 1.

In addition, the electrical and control system 200 may include a wind turbine controller 202. As shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258, 264) may be communicatively coupled to the communications module 209 using any suitable means. For example, as shown in FIG. 3, the sensors 252, 254, 256, 258, 264 are coupled to the sensor interface 211 via a wired connection. However, in other embodiments, the sensors 252, 254, 256, 258, 264 may be coupled to the sensor interface 211 via a wireless connection, such as by using any suitable wireless communications protocol known in the art. As such, the processor 204 may be configured to receive one or more signals from the sensors.

Still referring to FIG. 2, the generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. A rotor filter bus 219 electrically couples the rotor filter 218 to a rotor-side power converter 220. Further, the rotor-side power converter 220 may be electrically coupled to a line-side power converter 222. It should be understood that the rotor-side converter 220 and the line-side converter 222 may be any suitable type of converter. For example, the converters 220, 222 may be any one of or combination of the following: an AC-DC converter, an AC-AC converter, a DC-DC converter, a DC-AC converter, a bridge rectifier, a power semiconductor device, an insulated-gate bipolar transistor (IGBT), or similar. An IGBT is generally a three-terminal power semiconductor device primarily used as an electronic switch. The rotor-side power converter 220 and the line-side power converter 222 may have any configuration using any switching devices that facilitate operation of electrical and control system 200 as described herein. Further, the power conversion assembly 210 may be coupled in electronic data communication with the turbine controller 202 to control the operation of the rotor-side power converter 220 and the line-side power converter 222.

In one embodiment, a line-side power converter bus 223 may electrically couple the line-side power converter 222 to a line filter 224. Also, a line bus 225 may electrically couple the line filter 224 to a line contactor 226. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

Within the power conversion assembly 210, the rotor-side power converter 220 may be electrically coupled with the line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

During operation, the controller 202 may be configured to receive one or more voltage and/or electric current measurement signals from a first set of voltage and electric current sensors 252. Moreover, the controller 202 may be configured to monitor and control at least some of the operational variables associated with the wind turbine 100 via the sensors 252. In the illustrated embodiment, each of the sensors 252 may be electrically coupled to each one of the three phases of grid bus 242. Alternatively, the sensors 252 may be electrically coupled to any portion of electrical and control system 200 that facilitates operation of electrical and control system 200 as described herein.

In addition, the sensors may be configured to measure and/or monitor one or more operating parameters of wind turbine 100. In one embodiment, for example, the sensors may include, one or more of the following: the first set of voltage and electric current sensors 252, a second set of voltage and electric current sensors 254, a third set of voltage and electric current sensors 256, a fourth set of voltage and electric current sensors 264 (all shown in FIG. 2), and/or various temperatures sensors 258 (FIG. 4) for measuring one or more temperatures within the wind turbine 100.

It should also be understood that any other number or type of sensors may be employed and at any location. For example, the sensors may be a Micro Inertial Measurement Units (MIMUs), strain gauges, accelerometers, pressure sensors, temperature sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. Further, the sensors and/or devices may be part of the same wind farm, from different wind farms, or independent of any wind farm.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

The system 200 may also include a converter controller 262 configured to receive one or more voltage and electric current measurement signals. For example, in one embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 264.

Figure 4:
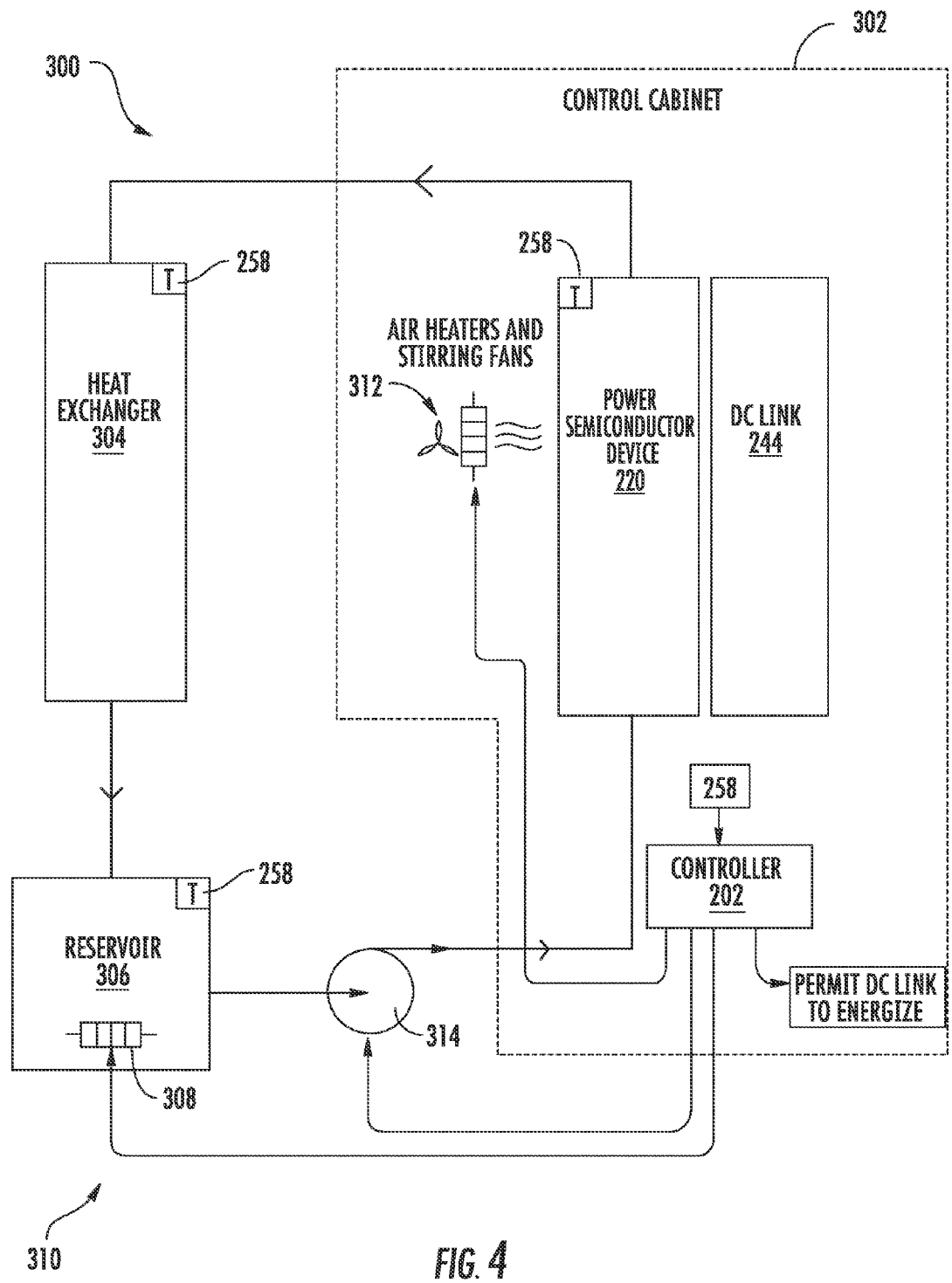
FIG. 4 illustrates a schematic diagram of one embodiment of a system for reducing ice and/or condensation that forms on a power component during a power outage according to the present disclosure.
Figure 5:
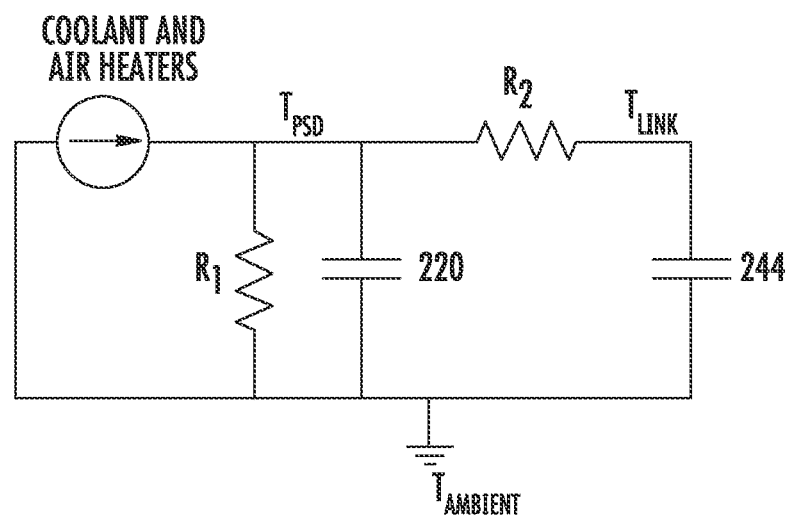
FIG. 5 illustrates a simplified, schematic diagram of one embodiment of the system according to the present disclosure.
Figure 6:
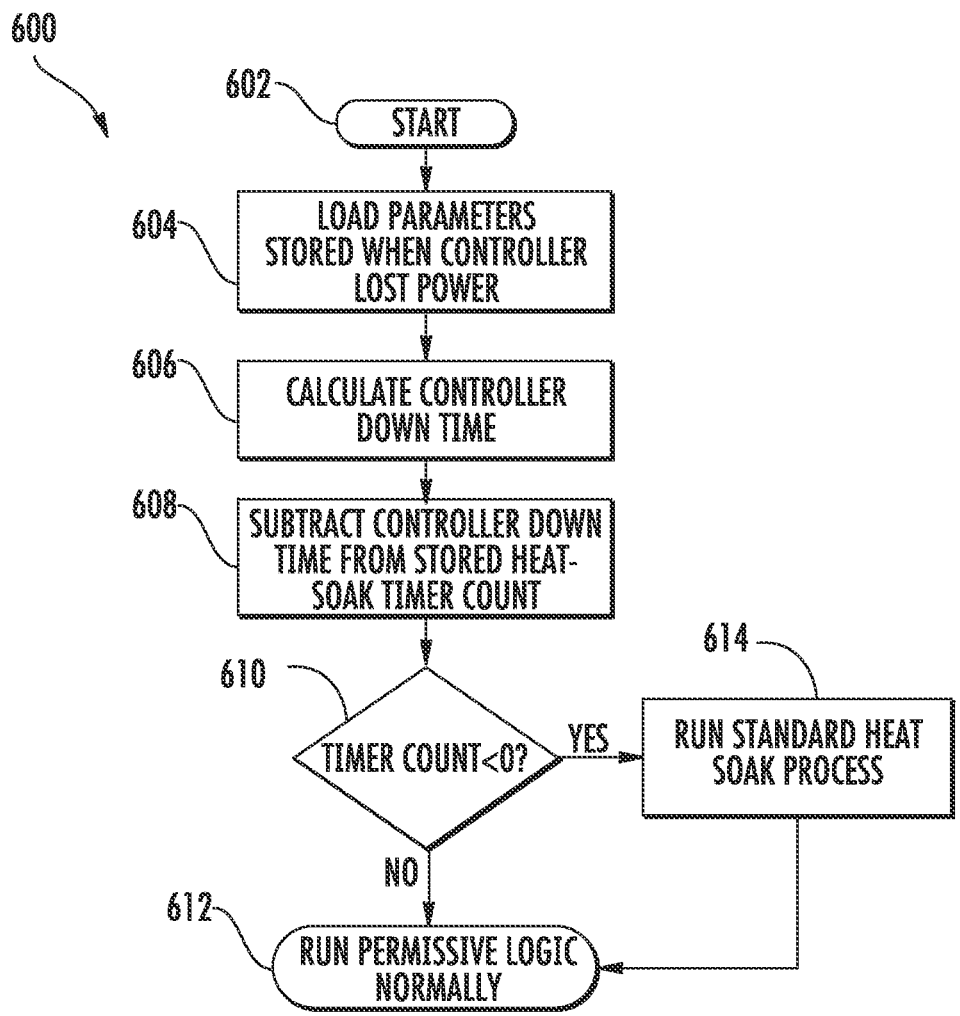
FIG. 6 illustrates a flow diagram of one embodiment of a heat soak timer initialization process according to the present disclosure; and, FIG. 7 illustrates one embodiment of a method for reducing ice and/or condensation that forms on a power component during a power outage according to the present disclosure.

Referring now to FIGS. 4-6, various embodiments of a system and method for reducing ice and/or condensation that forms on a power component of a wind turbine during a power outage according to the present disclosure are illustrated. For example, FIG. 4 illustrates a detailed, schematic diagram of one embodiment of a system 300 for regulating a surface temperature of a power component via a heat-exchange assembly 310 according to the present disclosure. FIG. 5 illustrates a simplified, electrical diagram of a relationship between the power semiconductor device 202 and the DC link 244 according to the present disclosure. FIG. 6 illustrates a flow diagram of one embodiment of a heat soak timer initialization process 600 according to the present disclosure.

As shown in FIG. 4, the system 300 typically includes a control cabinet 302 (as indicated by the dotted lines), the controller 202 (which includes processor 204) and a heat-exchange assembly 310. Further, the system 300 may include an observed power component and an additional monitored power component nearby. In the illustrated embodiment, for example, the observed power component is the DC Link 244, whereas the measured additional nearby power component is the power semiconductor device 220. As mentioned, in various embodiments, the power semiconductor device 220 may be an IGBT, an AC/DC converter, a bridge rectifier, or similar. As shown, the temperature of the power semiconductor device 220 is directly measured via temperature sensor 258. In conventional systems, it is common to measure the temperature of the power semiconductor device 220 to protect the device from overheating. As such, the system 300 is capable of utilizing the temperature measurements from existing temperature sensor 258 that may already be employed by conventional systems. Accordingly, in various embodiments, the system 300 does not require additional temperature or humidity sensors.

In contrast to the power semiconductor device 220, the temperature of the DC link 244 is observed, rather than measured. More specifically, the power semiconductor device 220 assists in inferring the surface temperature of the DC link 244 because the power components are electrically and thermally coupled together, e.g. by metal buswork. In addition, the DC link 244 caps are generally directly downstream from the power semiconductor device 220. As such, the air heaters and/or stirring fans 312 are configured to direct a channel of air over both the power semiconductor device 220 and the DC link 244 in a controlled fashion, thereby regulating the temperature of both components.

It should be understood that the heat-exchange assembly 310 may include any suitable components so as to regulate the surface temperature of the various power components of the system 300, e.g. the DC Link 244. More specifically, the heat-exchange assembly 310 may be configured to heat or warm the DC Link 244 for a certain amount of time so as to raise a surface temperature of the DC Link 244 above an ambient temperature. For example, as shown, the heat-exchange assembly 210 includes a heat exchanger 204, a reservoir 206 with an immersion heater 308, a coolant pump 314, and one or more air heaters/stirring fans 312. It should also be understood that the terms "heating," "heat," or similar as described herein do not require the use of actual heaters to increase a surface temperature of one or more of the power components. Rather, the surface temperatures of the power components may be increased using any components having a temperature equal to the ambient temperature or higher. Once the controller 202 receives one or more signals from the temperatures sensors 258 that the surface temperature of the measured device 220 (i.e. the power semiconductor device) is above the ambient temperature (i.e. indicating no ice or condensation is present), the controller 202 permits the DC link 244 to be re-energized.

Referring particularly to FIG. 5, a simplified, electrical diagram is provided to illustrate the relationship between the power semiconductor device 220 temperature ($T_{psd}$) and the DC link 244 temperature ($T_{link}$). As shown, the thermal model illustrates the power semiconductor device 220 connected in parallel with the DC link 244. The coolant and air heaters of the heat exchange assembly 310 increase the temperature of the power semiconductor device 220. External losses are taken into consideration as illustrated by the resistor $R_1$. The thermal impedance between $T_{psd}$ and $T_{link}$ is represented by resistor $R_2$. $T_{ambient}$ is represented in the thermal model as the ground, which provides the reference point in the electrical circuit from which $T_{psd}$ and $T_{link}$ can be measured.

Referring now to FIG. 6, the processor 204 may begin implementing the method of the present disclosure by initializing (step 602) a heat soak timer initialization process 600 when power is lost to the controller 202. It should be understood that the power outage can be voluntary (e.g. during a planned shutdown of the wind turbine 100) or involuntary (e.g. caused by a storm). Further, the power component of the illustrated embodiments is the DC link 244; however, it should be understood to those skilled in the art that this is for illustrative purposes only. As such, in additional embodiments, the power component may be any component of the wind turbine 100.

When the power outage ends, the processor 204 is configured to determine one or more parameters of the DC link 244. In addition, the processor 204 may be configured to store the parameters, e.g. the time at which the controller 202 lost power, in a memory store 207. In further embodiments, the parameters of the power component may include any one of or a combination of the following: a time stamp, a heat soak timer value, a permissive state, a thermal memory, and/or similar. The time stamp generally refers the time at which the controller 202 lost power. The heat soak timer value generally refers to the value of the heat soak time for the DC link 244 just before the controller 202 lost power. The permissive state generally refers to whether the DC link 244 and/or the power semiconductor device 220 were permitted to run just before the controller 202 lost power.

The processor 204 then loads and optionally stores the parameters in the memory store 207 (step 604). The processor 204 can then determine a down time of the controller 202 for the power outage (step 606). In addition, as shown in the illustrated embodiment, the processor 204 may subtract the down time from the stored heat-soak timer count (step 608). At step 610, if the subtracted timer count is greater than zero, the controller 202 is configured to run the permissive logic according to the present disclosure (step 612). In contrast, if the subtracted timer count is less than zero, the controller 202 is configured to run (step 614) a standard heat-soak process. For example, in one embodiment, the standard heat-soak process may include waiting until the $T_{psd}$ and coolant temperatures are above an ambient temperature, then "soaking" the power components for an additional 70 minutes before applying energy. In other words, the power components are heated for the wait time before supplying power such that a surface temperature of the DC link 244 is raised above the ambient temperature before it is re-energized.

The permissive logic or method as described herein is a modified heat-soak process that incorporates various parameters of the power component, the ambient temperature, and the down time of the controller 202 to determine a more accurate heat-soak time for the DC link 244. More specifically, the system 300 is configured to select between two wait times depending on external ambient temperature, wherein the wait time varies based on the one or more parameters of the DC link 244 and the down time of the controller 202. For example, if an external ambient temperature is sufficiently above a freezing temperature (e.g. 0° C.), then the wait time is set equal to one thermal time constant between the monitored power semiconductor device 220 temperature $T_{psd}$ and the observed DC link 244 temperature $T_{link}$. Alternatively, if the ambient temperature is below a freezing temperature, the wait time is set to a time empirically determined to guarantee ice and/or condensation removal. For example, in one embodiment, the wait times may be 15 and 70 minutes, respectively.

The empirical method for calculating the wait time if the ambient temperature is below a freezing temperature may be determined using a variety of methods. For example, in one embodiment, the method may include determining a thermal time constant between the $T_{psd}$ of the power semiconductor device 220 and the $T_{link}$ of the DC link 244. Further, as mentioned, the system 300 may be programmed to include the electronic thermal memory of the various power components of the wind turbine 100 (e.g. the DC link 244, the power semiconductor device 220, etc.). As such, based on the thermal memory of the power component, the system 300 may continue operation and refrain from resetting the heat soak timer to zero after a loss of controller 202 power.

The surface temperature of the DC link 244 may then be inferred based on at least one of the thermal memory, the time stamp, or the thermal time constant. More specifically, the system 300 is configured to determine a difference between the time at which the controller 202 lost power and the thermal time constant of the observed DC link 244 to infer the surface temperature of the DC link 244 at controller power-down. As such, when the controller 202 obtains power again, the processor 204 calculates the time difference from power on to power off and determines how much of the heat soak process is required to return to the DC link 244 to the appropriate surface temperature. Accordingly, the wait time may be determined based on the inferred surface temperature.

Figure 7:
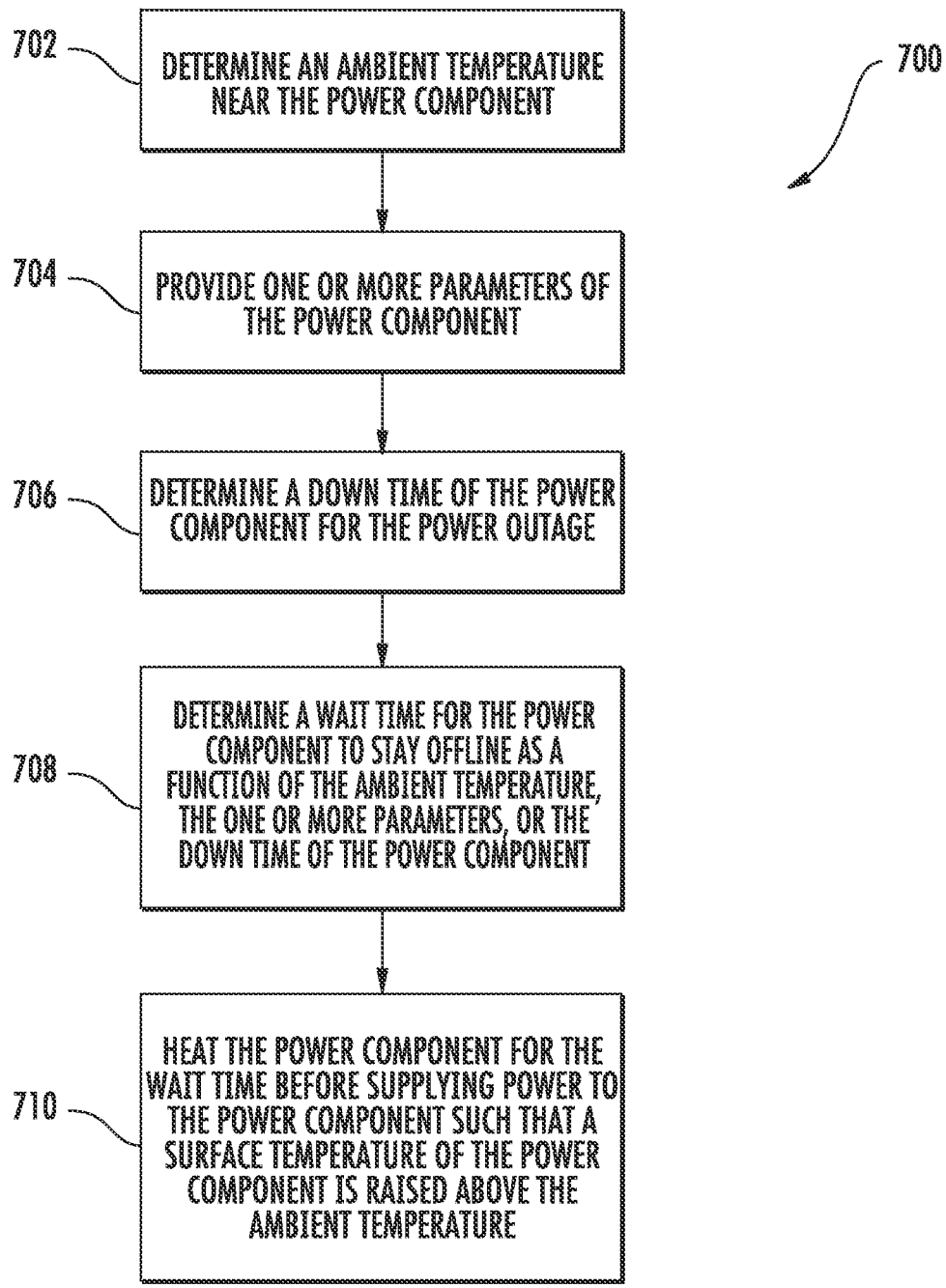

Referring now to FIG. 7, a method 700 for reducing ice or condensation that forms on a power component of a wind turbine 100 during a power outage is disclosed. The method 700 includes a step 702 of determining an ambient temperature near the power component. Further, the method 700 includes a step 704 of providing one or more parameters of the power component. Another step 706 includes determining a down time of the power component for the power outage. A next step 708 includes determining a wait time for the power component to stay offline as a function of the ambient temperature, wherein the wait time varies based on the one or more parameters and the down time of the power component. The method 700 also includes heating the power component for the wait time before supplying power to the power component such that a surface temperature of the power component is raised above the ambient temperature (step 710).

As mentioned, the system and method as described herein provide numerous advantages not present in the prior art. For example, in one embodiment, if all critical components of the DC link 244 are warm when the controller 202 loses power and the power it lost for a relatively short time, the controller 202 allows the DC link 244 to begin running almost immediately, thereby resulting in increased converter availability. Alternatively, if the power is lost for a relatively long time, the system and method of the present disclosure prevents the critical components of the DC link 244 from being energized until all of the components are raised to the ambient temperature or higher.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing ice or condensation that forms on a power component of a wind turbine during a power outage, the method comprising:
    determining an ambient temperature near the power component;
    providing one or more parameters of the power component;
    determining a down time of the power component for the power outage;
    determining a wait time for the power component to stay offline as a function of the ambient temperature, the one or more parameters, or the down time of the power component, wherein the wait time is approximately equal to a thermal time constant between an observed surface temperature of the power component and a monitored surface temperature of an additional nearby power component if the ambient temperature is above a freezing temperature and wherein the wait time is determined based at least on the thermal time constant and an inferred surface temperature of the power component at a start of the power outage when the ambient temperature is below the freezing temperature, and further wherein the inferred surface temperature is based on at least one of the thermal memory the time stamp, the down time, or the thermal time constant, and wherein the thermal time constant refers to a ratio of the density, volume, and heat capacity and a heat transfer coefficient and a surface area of the power component; and,
    heating the power component for the wait time before supplying power to the power component such that a surface temperature of the power component is raised above the ambient temperature.

2. The method of claim 1, wherein the power component of the wind turbine comprises a direct current (DC) link.

3. The method of claim 2, wherein the additional nearby power component of the wind turbine comprises a power semiconductor device, Wherein the power semiconductor device is electrically and thermally coupled to the DC link.

4. The method of claim 1, wherein the one or more parameters of the power component comprises at least one of a time stamp, a heat soak timer value, a permissive state, or a thermal memory.

5. The method of claim 1, wherein the step of determining the wait time based on the inferred surface temperature further comprises determining a difference between the heat soak timer value of the power component and the down time.

6. The method of claim 1, further comprising storing the one or more parameters of the power component in a memory store.

7. A method for reducing ice or condensation that forms on a power component of an energy system during a power outage, the energy system located in an uncontrolled temperature environment, the method comprising:
    determining an ambient temperature near the power component;
    providing one or more parameters of the power component;
    determining a down time of the power component for the power outage;
    determining a thermal time constant of the power component, wherein the thermal time constant comprises a ratio of the density, volume, and heat capacity of the power component and the heat transfer coefficient and the surface area of the power component;
    determining a wait time for the power component to stay offline as a function of the ambient temperature and the down time of the power component, wherein the wait time is approximately equal to the thermal time constant between an observed surface temperature of the power component and a monitored surface temperature of an additional nearby power component if the ambient temperature is above a freezing temperature, and wherein the wait time is determined based at least on the thermal time constant and an inferred surface temperature of the power component at a start of the power outage when the ambient temperature is at or below the freezing temperature; and,
    heating the power component for the wait time before supplying power to the power component such that a surface temperature of the power component is raised above the ambient temperature.

8. The method of claim 7, wherein the power component of the wind turbine comprises a direct current (DC) link.

9. The method of claim 8, wherein the additional nearby power component of the wind turbine comprises a power semiconductor device, wherein the power semiconductor device is electrically coupled to the DC link.

10. The method of claim 7, wherein the one or more parameters of the power component comprises at least one of a time stamp, a heat soak timer value, a permissive state, or a thermal memory.

11. The method of claim 7, wherein the wait time determined based at least on the thermal time constant and the inferred surface temperature of the power component at a start of the power outage when the ambient temperature is or below the freezing temperature further comprises determining a difference between the heat soak timer value of the power component and the down time.

12. The method of claim 7, farther comprising storing the one or more parameters of the power component in a memory store.

13. The method of claim 7, wherein the energy system comprises one of a wind turbine, a solar power system, or a gas turbine.

* * * * *